(12) United States Patent
Gray et al.

(10) Patent No.: US 7,379,948 B2
(45) Date of Patent: May 27, 2008

(54) SYSTEM AND METHOD FOR RETRIEVING REGISTRY DATA

(75) Inventors: David Michael Gray, Bellevue, WA (US); Kirk A. Glerum, Redmond, WA (US); Maithreyi Lakshmi Ratan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 10/924,533

(22) Filed: Aug. 23, 2004

(65) Prior Publication Data

US 2005/0038773 A1    Feb. 17, 2005

Related U.S. Application Data

(63) Continuation of application No. 10/426,144, filed on Apr. 28, 2003, now Pat. No. 6,789,086, which is a continuation of application No. 09/296,684, filed on Apr. 20, 1999, now Pat. No. 6,578,045.

(51) Int. Cl.
    *G06F 17/00* (2006.01)
(52) U.S. Cl. .................. 707/103 Z; 707/101; 707/102
(58) Field of Classification Search .................... 726/4; 707/101, 102, 103 Z
    See application file for complete search history.

(56) References Cited

OTHER PUBLICATIONS http://support.microsoft.com/kb/135398, dated Feb. 2, 2005.*
http://www.microsoft.com/technet/archive/winntas/tips/winntmag/inreg.mspx?mfr=true, year 2007.*
Security relevancy analysis on the registry of Windows NT 4.0 Du, W.; Garg, P.; Mathur, A.P.; Computer Security Applications Conference, 1999. (ACSAC '99) Proceedings. 15th Annual Dec. 6-10, 1999 pp. 331-338.*
Indirect Human Computer Interaction-Based Biometrics for Intrusion Detection Systems Yampolskiy, R.V.; Security Technology, 2007 41st Annual IEEE International Carnahan Conference on Oct. 8-11, 2007 pp. 138-145.*
Maintaining data-integrity in the back office registries of cities; a survey on organizational barriers and ways to address those Peters, R.; Jorg, P.; Meesters, M.; Hoogwout, M.; Stuart, E.; Availability, Reliability and Security, 2006. ARES 2006. The First International Conference on Apr. 20-22, 2006 p. 8 pp.*

* cited by examiner

*Primary Examiner*—David Y Jung
(74) *Attorney, Agent, or Firm*—Merchant & Gould P.C.

(57) ABSTRACT

Information is retrieved from the registry by creating a registry interface database containing information regarding registry data and uniquely identifying every registry entry for a registry interface. Source header files are generated using information about a program module, such as an application, contained in the registry interface database. The source header files are compiled with the application to generate the application's executable file. During run-time of the application, the registry interface is called by the application to retrieve registry data. If available, the registry interface retrieves the registry data and forwards this information to the application. In the event that the registry data is not available, the registry interface retrieves a default value in place of the registry data and forwards that default data to the application. A policy may be implemented by checking a policy area of the registry for the registry data and invoking the policy.

24 Claims, 10 Drawing Sheets

SYSTEM AND METHOD FOR RETRIEVING REGISTRY DATA

CLAIM OF PRIORITY

This application is a continuation of application Ser. No. 10/426,144, filed Apr. 28, 2003 now U.S. Pat. No. 6,789,086, which application is a continuation of application Ser. No. 09/296,684, filed Apr. 20, 1999, issued as U.S. Pat. No. 6,578,045, which applications are incorporated herein by reference.

FIELD OF THE INVENTION

The present invention supports the retrieval of information maintained in a computer database, such as the registry of a computer system. Specifically, the present invention provides an interface for retrieving information from a registry for one or more program modules operating on a computer system.

BACKGROUND OF THE INVENTION

Software applications utilize many resources of a computer system to aid them in performing their functions. These resources can include libraries and routines that assist the operation of an application by performing functions that the application would otherwise have to perform itself. Other resources include an operating system, which can control the application's interaction with the computer system, and a registry. The registry is a central repository for a computer system. An application can store and retrieve information in the registry for access during the next session of the application.

The information maintained by the registry can become difficult to manage as a result of an increase in the number of program modules, such as application programs, which use the resources of a computer system. For example, registry information has grown in size and complexity in response to an increased use of computer resources by multiple program modules of the computer system. Representative examples of problems arising from the use of prior registry-implemented storage systems are described below to illustrate the need for an improved mechanism for accessing and retrieving registry information.

One registry problem is the fragmentation of registry information. For example, information about use of a registry is typically contained within the application's source code. Managing registry information on a high level has been difficult because moving data in the registry often required a direct change of this source code. Additionally, finding registry information in the source code by a developer has been difficult because this information is located in each instance that the application requests registry data.

Another registry problem is the universal implementation of registry features. For example, sometimes a registry feature should be implemented across all registry calls. If a system administrator inserts an environment variable into a registry value, it is expected that an end value will properly interpret the environment variable. Today, however, this requires that all registry calls add an additional check and a new code section. Because this modification can represent a major code change when thousands of registry calls are involved, only certain registry calls typically include this feature.

A third registry problem is the efficient implementation of administrator policy. Administrators typically use scripts to impose policy settings on users. If an administrator desires to impose policy settings on a permanent basis, then the entire user registry is locked down to read-only permissions. When the entire registry is locked down, however, a user's individual settings do not persist from session to session.

And yet another registry problem is the administration of an increased data set by the registry. Because registry data is written to the registry at during an application's setup, the registry is typically filled with many values that never change. If some of the keys for those values are deleted, however, the application cannot run on the computer system. Because tracking key and value usage is difficult, some values may become obsolete or unnecessary, and are no longer needed over time. This results in the creation of registry "bloat." A determination of the values written by a set-up program or the values changed by a user is also difficult in the absence of an effective administration system for the registry.

And still another registry problem is the inefficient use of registry information by an application. Because registry information is typically scattered throughout the source code of an application, constant string data, such as registry key names, are often duplicated. One section of code can duplicate a significant number of characters when referencing a key name for a registry value. For thousands of registry entries, the performance of an application can be reduced by such duplicate code sections.

In view of the problems with prior registry operations, there is a need in the art for an improved mechanism for managing the registry. This improved registry management system would reduce fragmentation and support the consistent universal implementation of features and Administrator policy settings. This improved registry management system also would reduce registry bloat, while increasing the performance of an application that accesses the registry.

SUMMARY OF THE INVENTION

The present invention satisfies the above needs by providing a method for managing the retrieval of information maintained by a registry. The present invention can support the consistent universal implementation of features and Administrator policy settings, reduce registry bloat, and increase application performance, while reducing fragmentation. The present invention provides a registry interface database and a registry application program interface (API) for the efficient administration of registry operations.

The registry database can contain information regarding registry data and uniquely identifies each registry entry that will be utilized by the registry interface. Following the creation of this database, source header files are generated using information about a program module, such as an application, contained in the registry interface database. The source header files are compiled with the application to generate the application's executable file. The application's executable file can contain calls to the registry interface instead of direct calls to the operating system to access the registry. During run-time of the application, the registry interface is called to retrieve registry data. In the event that the registry data is not available, the registry interface can retrieve a default value in place of the registry data.

One aspect of the present invention provides a policy section of the registry. When a request for registry data is received by the registry interface, the policy section of the registry is checked first. If the policy data exists, then policy is invoked. If the data is does not found in the policy area, then the non-policy area of the registry is checked and the data, if it exists, is returned.

Another aspect of the present invention includes caching registry keys and building a key using tables containing relationships between key elements. This enables a single placement of key names and related data within the source code of an application, thereby avoiding multiple instances of constant data within the application.

Advantageously, the present invention allows for the consolidation of registry use, and the integration of registry design, and management and practice into one process that revolves around a central database and a registry interface. This can reduce registry bloat, streamline the application code, speeds up registry calls and eliminate duplicate constant information. In addition, the present invention can support the universal implementation of Administrator policy. These advantages, as well as other objectives recognizable by one of ordinary skill in the art, can be understood by a review of the detailed description, the appended drawings, and the claims.

DETAILED DESCRIPTION OF THE EXEMPLARY EMBODIMENTS

The present invention provides a registry interface database and a registry interface to efficiently support the operations of a registry for a computer system. In one embodiment for Microsoft's "OFFICE" programs suite, an Office Registry API (ORAPI) is used with an ORAPI database, which is a central database of registry information. The ORAPI database uniquely identifies each registry entry available for use by the ORAPI. For example, the ORAPI database describes each registry entry, outlines properties and attaches a unique registry identifier ("rid") to the registry data. This unique identifier or "rid" can be passed to the ORAPI to provide an abstracted look at the content of the registry. When the application requires the use of a registry value, it can use the "rid" to find that value.

During run-time, an application can call the ORAPI to retrieve registry data. This call for registry data is made directly to the registry interface rather than to the registry itself. The ORAPI, with support from the ORAPI database, can return the requested registry information to the application. For one embodiment, the ORAPI can check a policy area of the registry to determine if a policy is in effect for the requested registry data. If the data is not contained in the policy area, a non-policy area of the registry is checked. If data does not exist for the requested registry key, then a default value, if available, is supplied to the application by the ORAPI.

Figure 1:
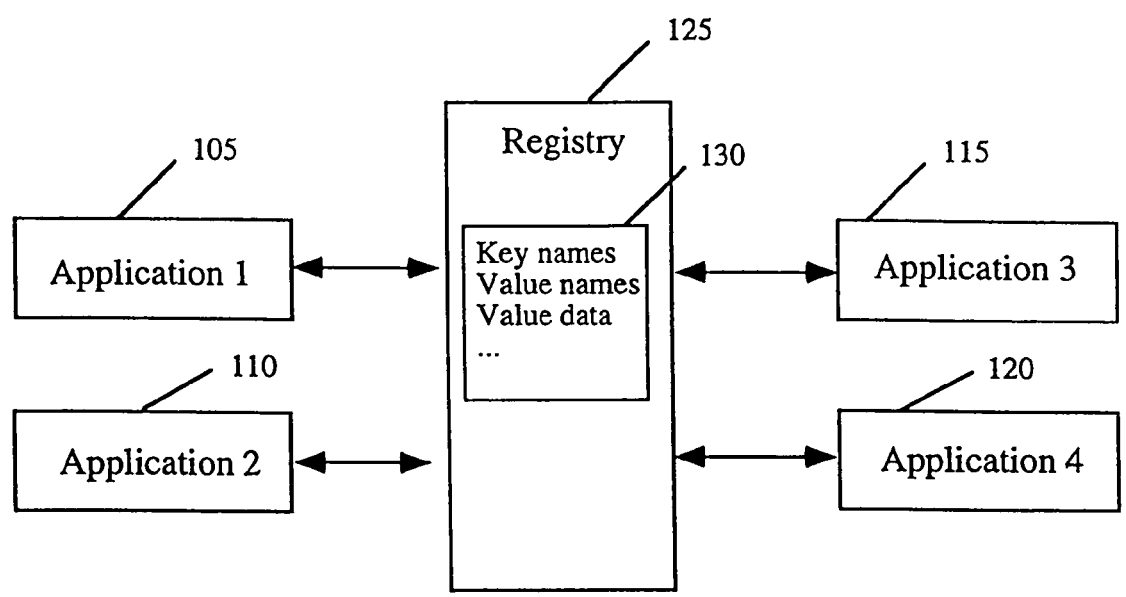
FIG. 1 is a block diagram depicting multiple applications and their interaction with a registry as implemented in the prior art.

Turning now to the drawings, in which like reference numbers represent like elements throughout the several figures, aspects of the present invention and the exemplary operating environment will be described. FIG. 1 is a block diagram depicting an application's interaction with a registry as known in the prior art. Generally, a registry 125 comprises data items 130 required by multiple applications during their execution on a computer system. The data items 130 typically comprise key names, key values and associated data types. Applications use the registry 125 to store information that can be used in different application sessions. For example, a placement of a window or toolbar in the application may be stored in the registry. When another session of the application is executed, the application can retrieve this information from the registry, and the location of the window or toolbar will be defined in a manner identical to the previous session.

FIG. 1 also depicts four program modules, Application 105, Application 110, Application 115, Application 120, which interact with the registry 125. It will be recognized to those skilled in the art that while only four program modules, designated Applications 1, 2, 3 and 4, are depicted in FIG. 1 as interacting with the registry, numerous applications and other types of program modules can access the registry. The use of the registry is typically governed by the size of the registry, the amount of information that a developer intends to place in the registry, and the amount of information an application will place in the registry.

Each of the Applications 105-120 can interact with the registry 125 to write specific information needed by these programs between sessions. However, the Applications 105-120 also can interact with the registry 125 to retrieve information required for operation of these programs. For example, if an application requires control panel information, it can retrieve this information from the registry. The control panel information may not be specific just to one application and, in fact, may be required or desired by any of the Applications 105-120. For this representative example, each of the Applications 105-120 may include calls to the registry 125 for the control panel information.

In addition, each of the Applications 105-120 can add information to the registry 125 for use by other applications. Yet, other applications may not be aware that this added information is available in the registry. Therefore, data that potentially can be used by more than one application is typically placed several times within the registry, thereby creating data redundancy within this data store. Because each of the Applications 105-120 can write information to the registry 125, it is difficult to obtain a high level view of all registry information.

Figure 2:
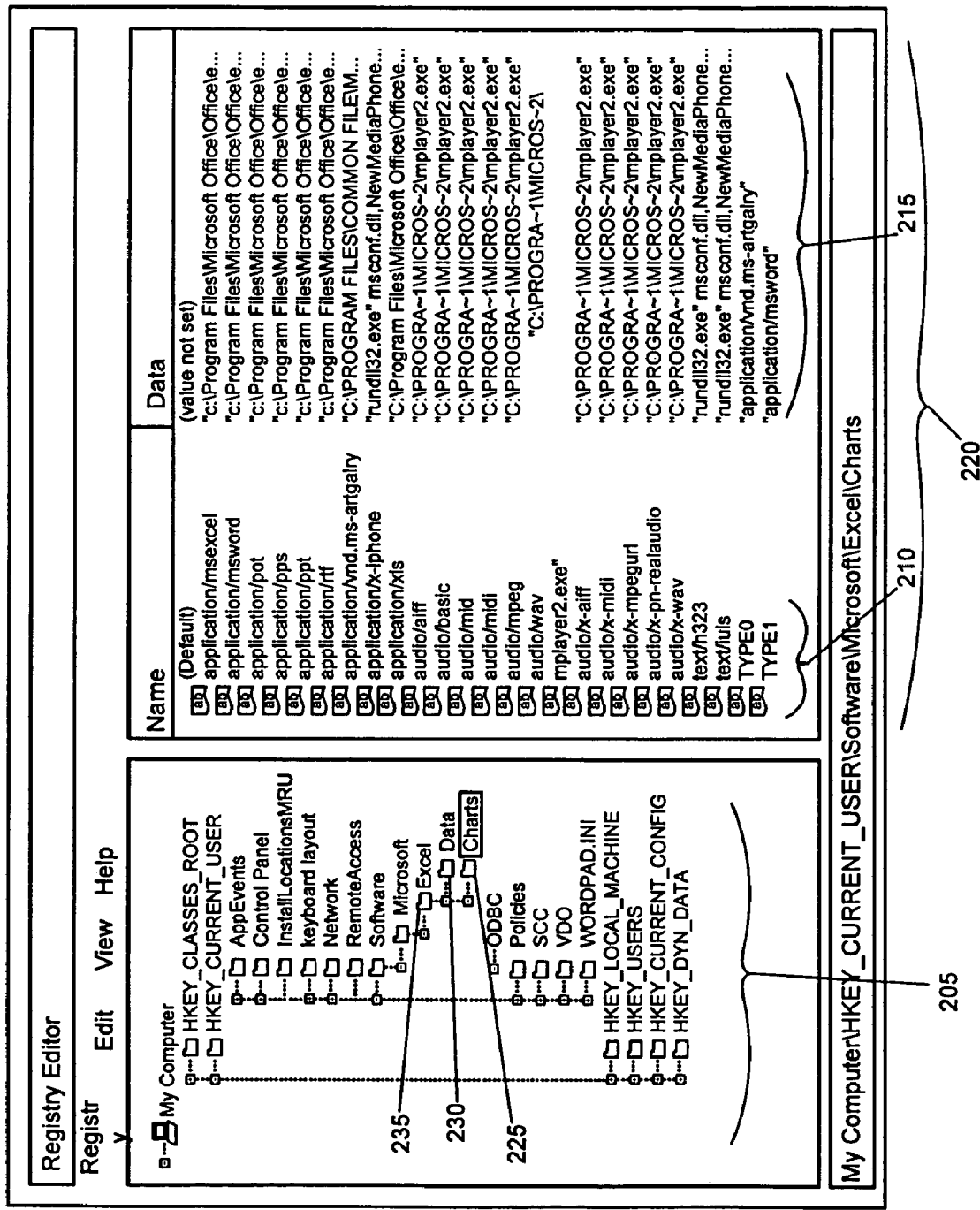
FIG. 2 is a listing of representative information contained in a registry as implemented in the prior art.

FIG. 2 depicts a listing of representative information contained in a registry as implemented in the prior art. The registry comprises a hierarchical structure of keys 205 and values 220, each associated with a specific key. To access the values related to a specific key, the entire key name is utilized. For example, to open the "Charts" key 225, the entire path is utilized. The "Charts" key 225 is represented in FIG. 2 by the path "HKEY_CURRENT_USER\\Software\\Microsoft\\Excel\\Charts". The application uses this long string name or path to access the values associated with the "Charts" key 225. Similarly, should an application desire to open the "Data" key 230, it would access the path "HKEY_CURRENT_USER\\Software\\Microsoft\\Excel\\Data". It should be noted that the characters required to distinguish between the two keys "Charts" 225 and "Data" 230 are minimal because many of the characters in these paths are the same (e.g., "HKEY_CURRENT_USER\\Software\\Microsoft\\Excel\\"). Consequently, because an application typically stores such string information within this hierarchical structure in the registry, the registry application can become bloated with the strings required to access keys at a similar hierarchical level.

Values 200 associated with the keys 205 are also contained in the registry. Values 220 comprise value names 210, value data 215, and other information, such as a value data type (not shown). Applications utilize the registry by opening the appropriate key, which typically requires the use of a lengthy character string to access the value for that key. In particular, opening a certain key may actually require multiple open operations if the key is nested, as illustrated by the keys 225 and 230. This allows an application to access the value names and data associated with the opened key.

Figure 3:
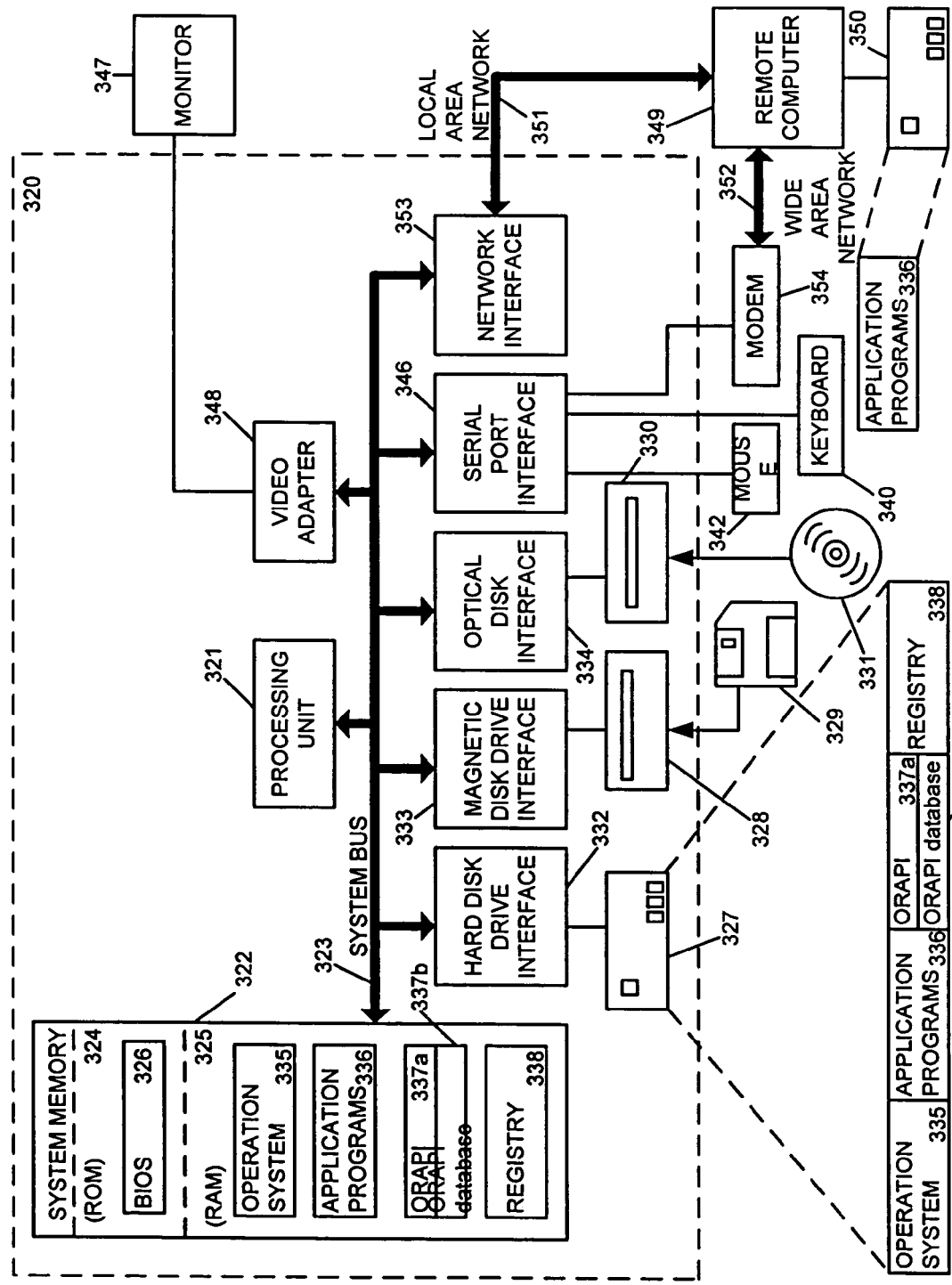
FIG. 3 is a block diagram of an exemplary computing environment for an embodiment of the present invention.

FIG. 3 is a block diagram of an exemplary computing environment for an embodiment of the present invention. FIG. 3 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a conventional personal computer 320, including a processing unit 321, a system memory 322, and a system bus 323 that couples the system memory to the processing unit 321. The system memory 322 includes read only memory (ROM) 324 and random access memory (RAM) 325. A basic input/output system 326 (BIOS), containing the basic routines that help to transfer information between elements within the personal computer 320, such as during start-up, is stored in ROM 324. The personal computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage for the personal computer 320. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data items may be stored in the drives and RAM 325, including an operating system 335, one or more application programs 336, a registry interface, such as an ORAPI 337*a*, a registry database, such as an ORAPI database 337*b*, and a registry 338. Those skilled in the art will recognize that the registry 338 can be implemented as a part of the operating system 339. A user may enter commands and information into the personal computer 320 through a keyboard 340 and pointing device, such as a mouse 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a game port or a universal serial bus (USB). A monitor 347 or other type of display device is also connected to the system bus 323 via an interface, such as a video adapter 348. In addition to the monitor, personal computers typically include other peripheral output devices (not shown), such as speakers or printers.

The personal computer 320 may operate in a networked environment using logical connections to one or more remote computers, such as a remote computer 349. The remote computer 349 may be a server, a router, a peer device or other common network node, and typically includes many or all of the elements described relative to the personal computer 320, although only a memory storage device 350 has been illustrated in FIG. 3. The logical connections depicted in FIG. 3 include a local area network (LAN) 351 and a wide area network (WAN) 352. Such networking environments are commonplace in offices, enterprise-wide computer networks, intranets and the Internet.

When used in a LAN networking environment, the personal computer 320 is connected to the LAN 351 through a network interface 353. When used in a WAN networking environment, the personal computer 320 typically includes a modem 354 or other means for establishing communications over the WAN 352, such as the Internet. The modem 354, which may be internal or external, is connected to the system bus 323 via the serial port interface 346. In a networked environment, program modules depicted relative to the personal computer 320, or portions thereof, may be stored in the remote memory storage device. It will be appreciated that the network connections shown are exemplary and other means of establishing a communications link between the computers may be used.

Figure 4:
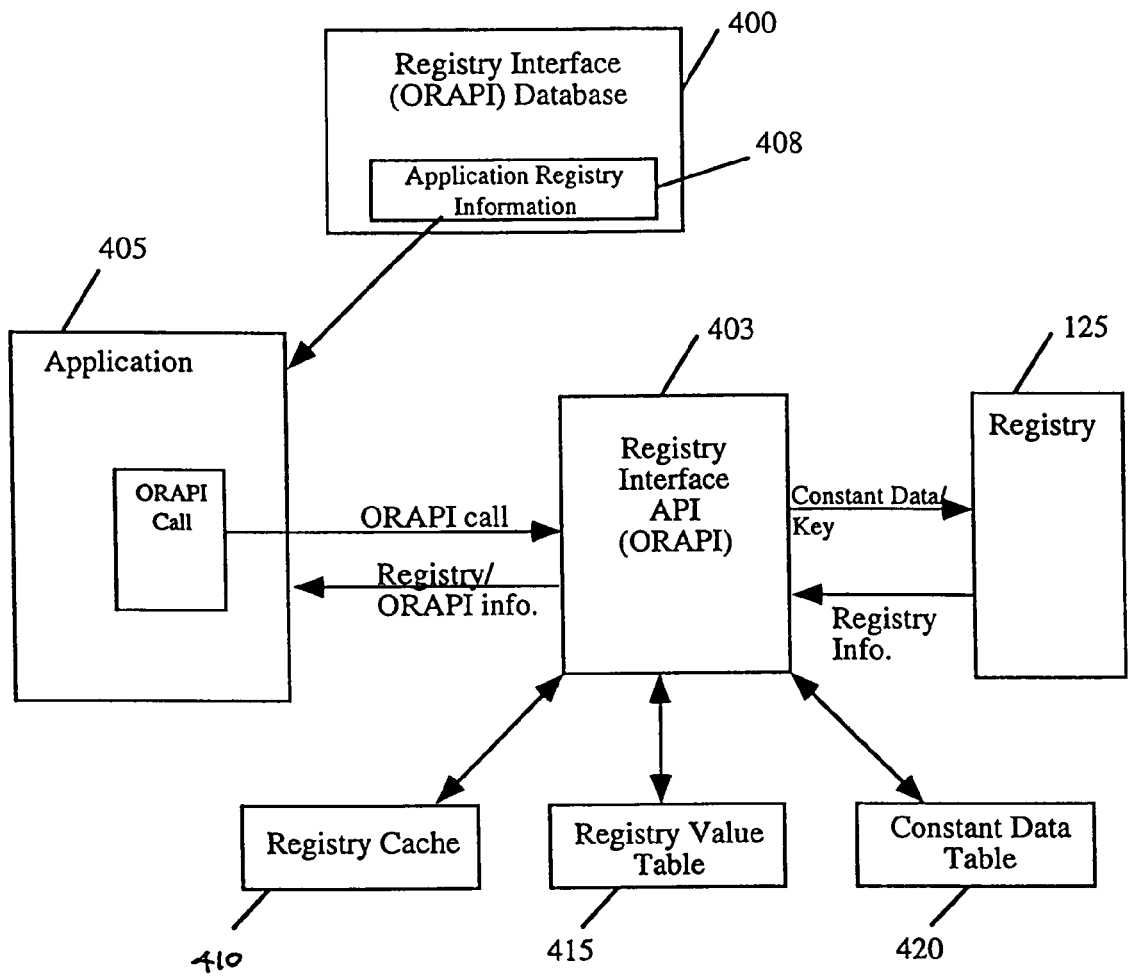
FIG. 4 is a block diagram depicting the components of an exemplary embodiment of the present invention.

FIG. 4 is a block diagram depicting the components of an exemplary embodiment of the present invention. Exemplary components comprise a registry interface database 400, an application 405 or other program module, a registry interface, also called a registry application programming interface (API) 403, and the registry 125. In one embodiment of the present invention, the registry interface is implemented as the ORAPI, which is intended for use within the "WINDOWS" operating system programming environment in connection with Microsoft's "OFFICE" programs suite. Further components include registry cache 410, registry value table 415, and constant data table 420. Because the values of the registry value table 415 represent constant values, those skilled in the art will appreciate that these registry values also can be maintained in the constant data table 420.

A developer of the application 405 can modify the registry interface database 400 to include registry information for use by that application. This information, which can be stored as application registry information 408, is typically incorporated into the application 405 during build-time. The developer also defines calls to the registry interface 403 to support the indirect retrieval of registry values and data from the registry 125 by the application 405. The application 405 can call the registry interface 403 by using a variable derived from information contained in the registry interface database 400. For example, a variable might be a number associated with a specific registry key.

Upon receiving this variable, the registry interface 403 can generate a registry key by using the constant data table 420. It is preferable to use the constant date table 420 to improve the performance of the registry interface 403. In one embodiment, the constant data table 420 contains a relative position between the elements that make-up the keys in the registry 125. For example, assume that the application 405 desires to retrieve the key "microsoft\\office\\word". In this case, the variable passed to the registry interface 403 from the application 405 might be a variable associated with the key element "word". This variable can be a number associated with an element using the "enum" structurefunction.

The relative position information contained in the constant data table 420 defines whether a key element is a parent or child of other elements that comprise the key. When the registry interface 403 is passed the variable representing the key element "word", the registry interface builds the string "microsoft\\office\\word" by using the constant data table 420. This is accomplished by determining that the key element "word" is a child of the key element "office," which is also a child of the key element "microsoft". The registry interface 403 can build the complete key string by merging all of the parents onto the given child. The minimum amount of the key can be built by using the registry cache 410 to supply the root from which to open the key. For example, if the "microsoft" key was previously opened, then that key is used, and only the remainder "office\\word" need be built by the registry interface 403.

When retrieving a registry value name, the registry value table 415 can be used in a similar manner as the constant data table 420. For example, the registry interface 403 can build a key using the constant data table 420 and the registry value table 415. The registry interface 403 can use this key to retrieve from the registry 125 information required by the application 405.

The registry cache 410 is also used by the registry interface 403 in order to speed access to often used keys. It is preferable to place in cache a designated number of keys that have previously been retrieved. Should an application require several calls to a specific key or key value, that information can be quickly retrieved from the cache. The size of the cache within the system memory is implementation dependent.

Figure 5:
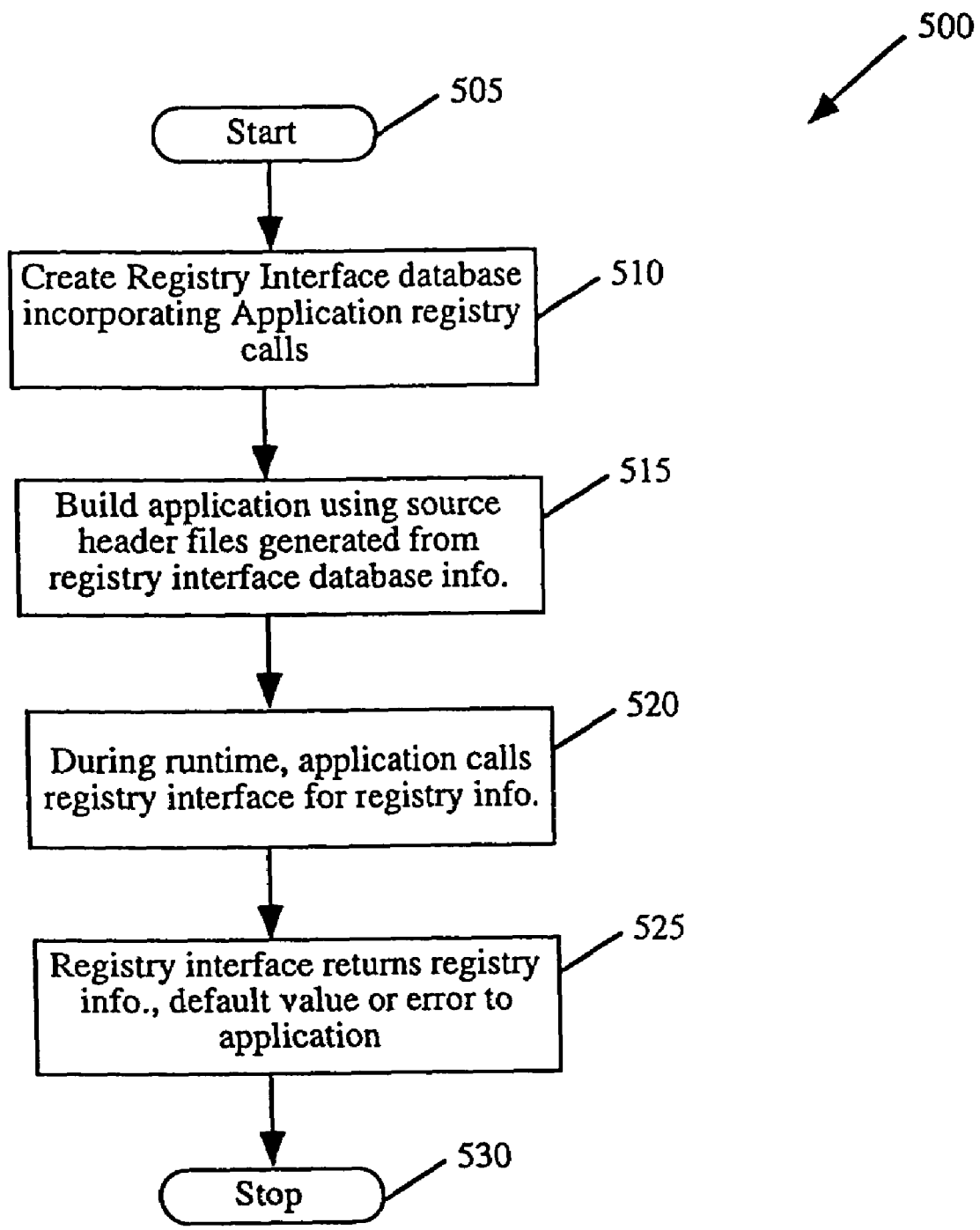
FIG. 5 is a flowchart depicting the steps performed in accordance with an exemplary embodiment of the present invention.

FIG. 5 is a flow chart depicting the steps performed in accordance with an exemplary embodiment of the present invention. A method 500 begins at step 505, the "Start" step, and continues to step 510. In step 510, a registry interface database is created incorporating application registry calls. The database created in step 510 is represented by the registry interface database 400 of FIG. 4 and can include information required for a call to the registry that normally the application would perform directly. For example, the key name for a certain registry call can be incorporated into the database. This database also can include default values, which are used when the information is not available in the registry. The database also serves to provide an overview of all calls performed by a specific application to the registry. This allows for efficient management of registry calls and enables a developer to view the database and observe its interaction with the registry. Necessary changes for registry calls can be accomplished by changing the database contents rather than searching all source files that make up an application and modifying the registry calls for these various source files.

Proceeding to step 515, the application is built using source header files generated from information maintained in the registry interface database. These source header files incorporate calls to the registry interface, such as the registry interface 403 of FIG. 4. At build-time, the application's source files, as well as the source header files, are compiled to create an application executable file that can generate calls to the registry interface and retrieve registry information. It is well recognized in the art that multiple files can be compiled to generate an executable file for an application.

Those skilled in the art will appreciate that the application may still make direct calls to the registry and directly retrieve data from the registry while also using the present invention to indirectly retrieve data from the registry. However, use of the additional information in the registry database while making fewer direct calls to the registry can increase the ability to manage the registry at a high level.

Proceeding to step 520, during run-time, the application calls the registry interface for registry values. Because the source header files were added, while certain direct registry calls were removed during application build-time, the application can now call the registry interface to obtain registry information. The registry interface can generate a constant data string and retrieve the appropriate registry data required by the application. Proceeding to step 525, the registry interface returns the registry value, a default value or an error to the application. The method 500 terminates at the "Stop" step 530.

Figure 6:
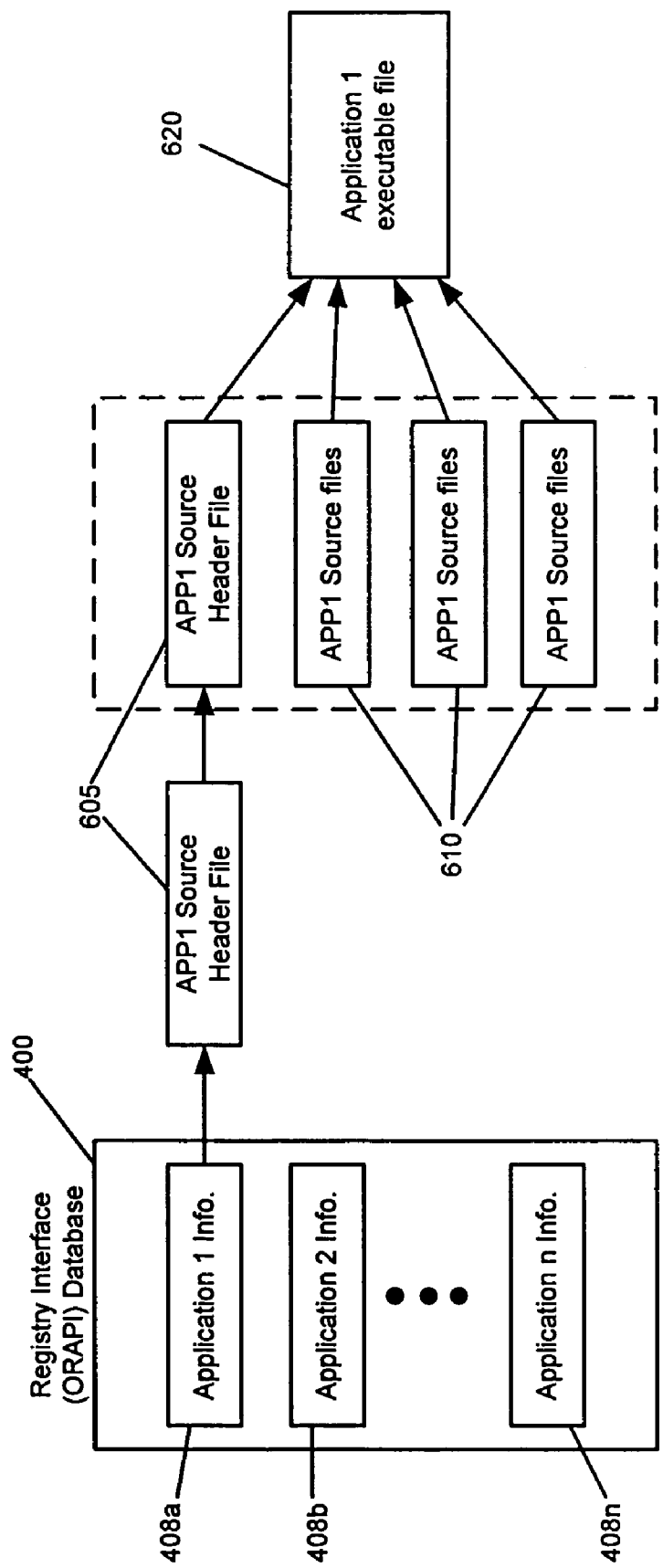
FIG. 6 is a block diagram of the components used during the build process of an application in accordance with an exemplary embodiment of the present invention.

FIG. 6 is a block diagram of the components that support the build process for an application in an exemplary embodiment of the present invention. The registry interface database 400 contains information about the various applications that utilize the database. For example, the registry interface database 400 contains information 408a-n for applications 1-n. To build an application that utilizes the registry interface database 400 (and the registry interface, such as the) Application 1, with respect to the information 408a in the registry information database 400 is used, as previously described with respect to FIG. 5.

The APP1 source header file 605 for Application 1 can be created based on the information 408a. The source header file is preferably developed in a language that can be supported by a compiler because this source header file is typically compiled with other source files of the application to generate an executable application file. For example, the source header file 605 is compiled with other source files 610 for the Application 1 to generate the application's executable file 620.

Figure 7:
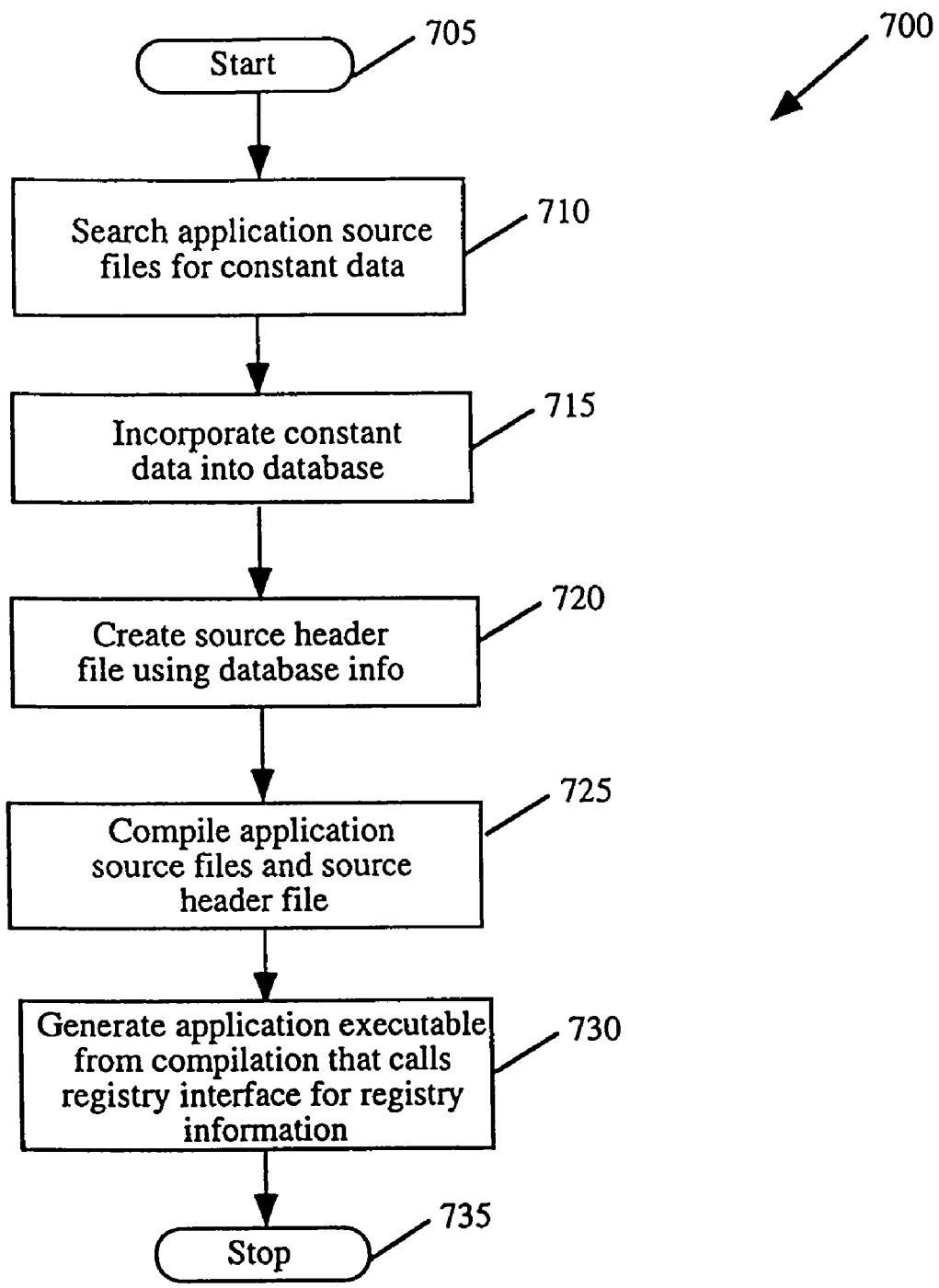
FIG. 7 is a flowchart depicting the steps performed during the application build process in accordance with an exemplary embodiment of the present invention.

FIG. 7 is a flow chart depicting the steps performed during the application build process in accordance with an exemplary embodiment of the present invention. A method 700 begins at the "Start" step 705 and proceeds to search the application source files for constant data and registry calls in step 710. As stated earlier, an exemplary embodiment of the present invention can be utilized without removing every registry call from the application's source files. For example, a developer may desire to write and retrieve information outside of the control of the registry interface database and the registry interface of the present invention. However, this does not prevent the application from using the exemplary embodiment for those calls that the developer wishes to have flow through the registry interface.

Proceeding to step 715, direct registry calls removed from application source files are placed into the registry interface database. In addition to these calls, the developer also may place constant data, including default values, in the registry interface database. The default values represent "default" data for a registry value in the event that a registry value can not be returned to an application in response to a call.

Following the incorporation of constant data into the registry interface database, the source header files are created in step 720 by using information placed into the registry interface database. Automated scripts may be used to generate source header files that will eventually be compiled with the other source files in building the application's executable file. The generation of source header files are well-known to those skilled in the art and any method which retrieves information from a database to create header files are considered within the scope of the present invention. The source header file is typically implemented as a text file containing information obtained from the registry interface database. The text file contains data to support a replacement of direct registry calls in accordance with the operation of an exemplary embodiment.

Proceeding to step 725, the application source files, as well as the source header file, are compiled in step 725. An application's executable file is then generated in step 730 based on the compilation of the application source files and the source header file. This executable file can make a call to the registry interface in place of a direct registry call, as defined by the information maintained in the source header files. Following the generation of the application's executable file, the method 700 proceeds to the "Stop" step 735 and terminates.

Figure 8:
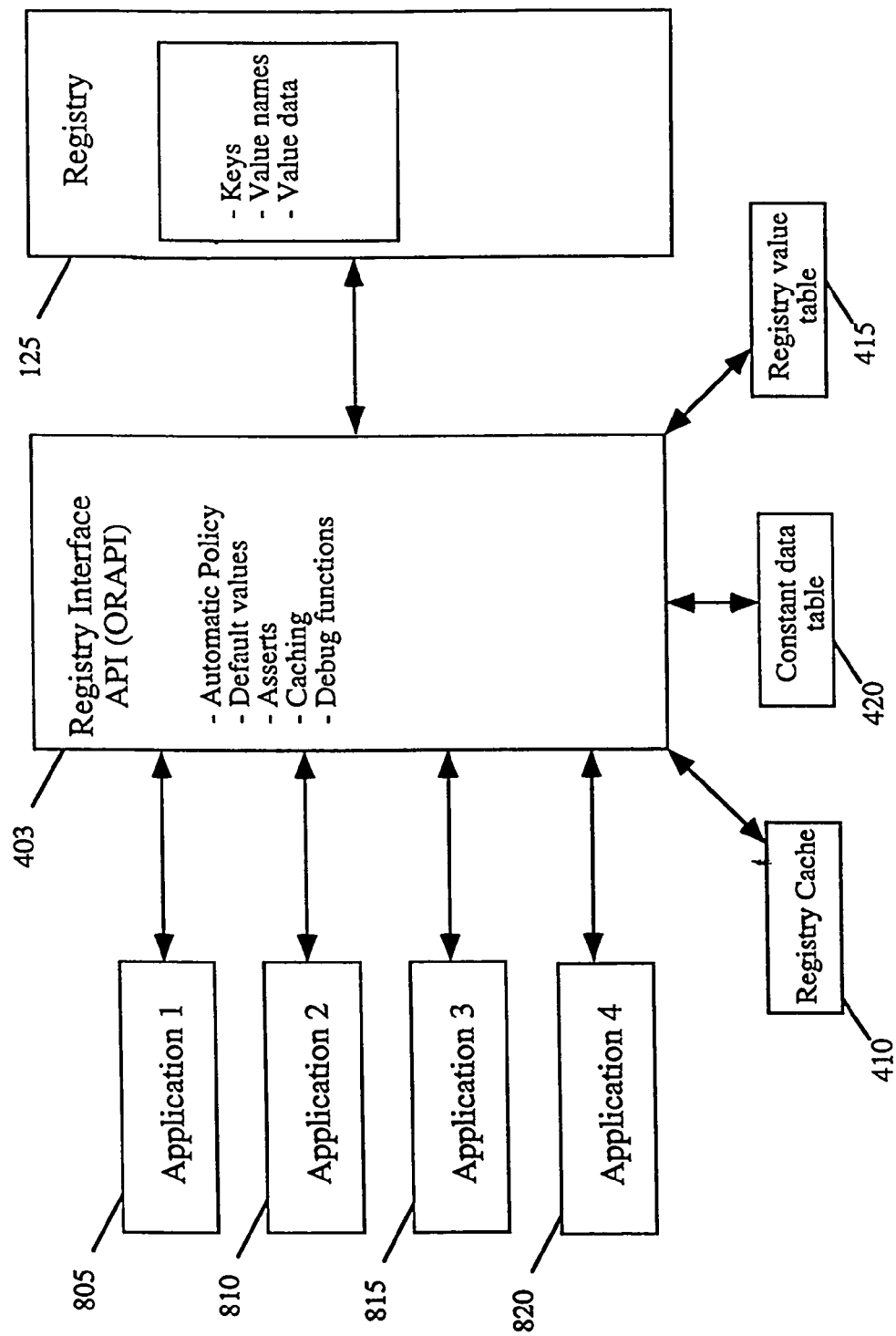
FIG. 8 is a block diagram depicting the interaction between multiple applications, a registry and a registry interface during runtime in accordance with an exemplary embodiment of the present invention.

FIG. 8 is a block diagram depicting the interaction between applications, a registry, and a registry interface during run-time in an exemplary embodiment of the present invention. Exemplary components used during run-time include one or more applications, such as the Applications 805-820, the registry interface (ORAPI) 403, the registry 125, the registry cache 410, the constant data table 420, and the registry value table 415.

At build-time, the registry interface database 400 of FIG. 4 is utilized to create source header files associated with the executable file for each application, such as the Applications 1-4 shown in FIG. 8. The Applications 805-820 are different from the applications referenced in FIG. 1, namely the Applications 105-120, because the executable files of Applications 805-820 have been built using the registry interface database. For example, the executable files of Applications 805-820 can be built using the source header files, as previously described with respect to FIG. 7.

Applications 805-820 can indirectly communicate with the registry 125 through the registry interface 403. In one embodiment of the present invention, the registry interface 403 is implemented as the ORAPI. The registry interface 403 also communicates with the constant data table 420, the registry value table 415, and the registry cache 410. The registry cache 410 stores previously retrieved registry data and registry key values for future quick retrieval of often-used and required key data. The constant data table 420 can be utilized by the registry interface 403 to generate a key string, which is useful for retrieving the registry value and the registry data from the registry 125. The constant data table 420 and the registry value table 415 can be constructed as hierarchical data structures to support the storage of relational key names and values.

The registry interface 403 typically contains functions that support the interaction between the registry 125 and the Applications 805-820. For example, representative functions of the registry interface 403 include automatic policy checking, the use of default values, asserts for debugging and caching. The registry 125 typically contains registry values, value names, value data and other related information, such as data types for the values. No modification to a conventional registry is required to implement exemplary embodiments of the present invention.

Figure 9:
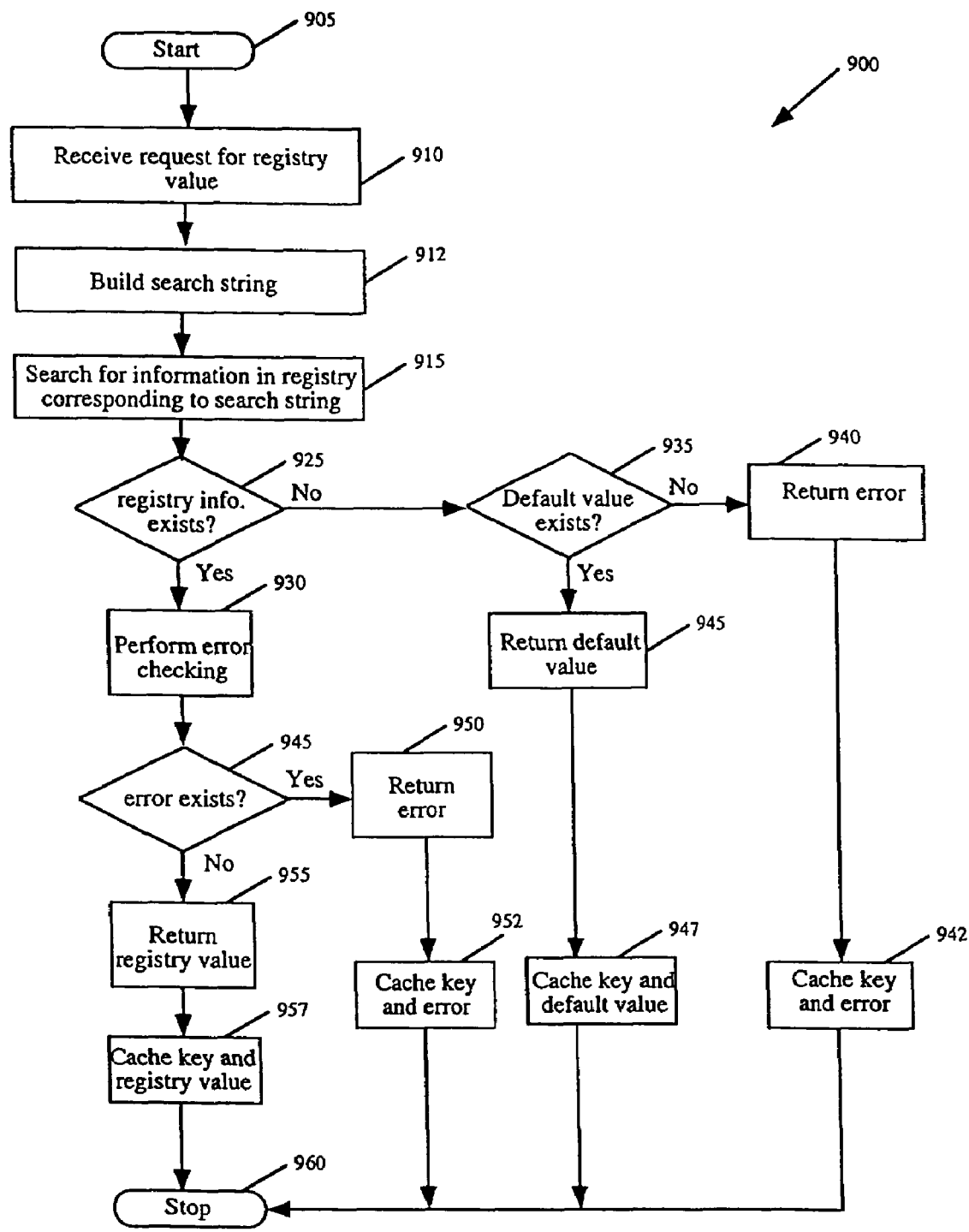
FIG. 9 is a flowchart depicting the steps performed during an application's run-time in accordance with an exemplary embodiment of the present invention.

FIG. 9 is a flowchart depicting the steps performed during an application's run-time in accordance with an exemplary embodiment of the present invention. A method 900 begins at the "Start" step 905 and proceeds to step 910, where a request is received for a registry value. The request may be made by an application, such as one of the Applications 805-820 shown in FIG. 8, or may be made by another program module, such as an operating system. However, the program module issues the request for the registry value to the registry interface, rather than placing this request directly with the registry.

After receiving the request, a string is built in step 912 to request information from the registry. This string represents a registry key and can be constructed by using a relational table that contains constant data and relationship information for key elements. For example, in the event that the string "microsoft\\office\\word" represents the key to be opened, the request may include only the key element "word" or a variable representing the key element. The relational table can be used to generate the entire key string "microsoft\\office\\word" based on relationship information maintained for the individual key elements. In this case, the relational table includes relationship information that identifies "word" as a child of "office," which is also a child of "microsoft". This relational information is used to construct the string, which represents constant data maintained in the registry.

Proceeding to step 915, a search is conducted for information in the registry based on the key string. The application is only required to pass one variable, representing the key element, to support the construction of the entire key string. This variable, which is passed in step 910, can be a number that is associated with the key element. The entire key can be used to search for the registry value desired by the application.

In step 925, a determination is made whether registry information exists that is related to the key string. In the event that the required registry information is not available, then an inquiry is conducted to determine if a default value exists in step 935.

Should a default value exist, then the "Yes" branch is followed from step 935 to step 945 and a default value is returned to the application. The default value and the key are then placed into cache memory during step 947. It is preferable to use cache memory to save processing time associated with a search for often-used key values and data. Following step 947, the method 900 then proceeds to "Stop" step 960 and terminates.

In the event that the default value does not exist, the "No" branch is followed from step 935 to step 940 and a failure or error message is returned to the application. This failure may be implemented by returning a failure code understood by the application or by passing an error confirming the registry value did not exist for the designated key. Following step 940, the method 900 proceeds to step 942, where the key value and the error are placed in cache memory. The method 900 then terminates at the "Stop" step 960.

If the inquiry in step 925 determines that registry information is available, then the value is retrieved from the registry and the "Yes" branch is followed to step 930. Error checking is performed in step 930 on the retrieved registry information. As described in more detail with respect to FIG. 10, the registry information can represent either a policy value or a user registry value. For example, error checking can be conducted by type checking the registry data against the value expected by the application. It is possible, for example, that the application has changed the data type of the requested registry value and has not updated the registry with that change. By performing the error checking in step 930, the forwarding of inaccurate data to the application is prevented. Those skilled in the art will recognize that a variety of conventional error checking operations can be performed by an exemplary embodiment and that type checking is only a representative example.

Proceeding to step 945, an inquiry is conducted to determine whether an error exists based on the error checking task completed in step 930. If an error is detected, the "Yes" branch is followed from step 945 to step 950. An error is returned to the application in step 950. In turn, the key and the corresponding error are placed in cache memory for possible future reference. The method 900 then terminates at the "Stop" step 960.

If, on the other hand, an error is not detected in step 945, the "No" branch is followed to step 955. The registry value is returned to the requesting application in step 955. In addition, the key and the corresponding registry value are placed in cache memory in step 957. The method 900 then terminates at the "Stop" step 960.

Figure 10:
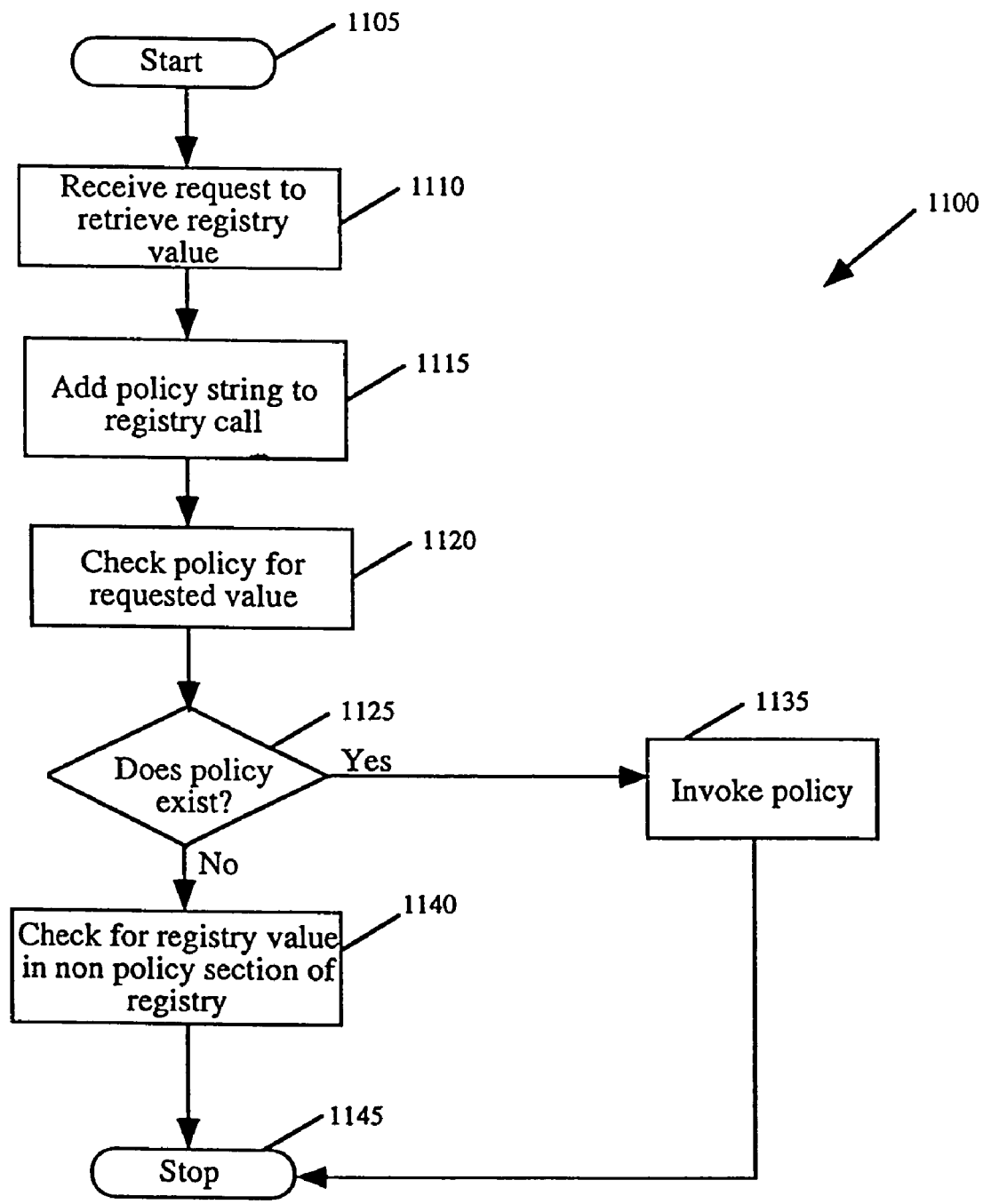
FIG. 10 is a flowchart depicting the steps performed for managing an automatic policy in accordance with an exemplary embodiment of the present invention.

FIG. 10 is a flowchart depicting the steps completed for implementing an automated policy feature in accordance with an exemplary embodiment of the present invention. A method 1100 begins at the "Start" step 1105 and proceeds to step 1110, where a request is received to retrieve a registry value.

Proceeding to step 1115, the registry interface adds a policy string to the registry call in response to the request to retrieve a registry value. This policy string directs the search for the registry value to the policy section of the registry.

At step 1120, the policy section of the registry is checked to determine if a selected registry value is maintained by the registry. The policy section of the registry is preferably implemented as a shadow area of a non-policy registry section. The preferred tree structure of the policy section can mimic the tree structure of the non-policy section of the registry.

At step 1125, a determination is made whether a policy exists, i.e., does the requested value exist in the policy section of the registry. If the value exists, then the "Yes" branch is followed to step 1135, where the policy is invoked.

If the registry value does not exist in step 1125, then the "No" branch is followed to step 1140. The non-policy section of the registry is checked in step 1140 for the selected registry value.

Upon completion of step 1135 or step 1140, the method 1100 terminates at the "Stop" step 1145.

It will be recognized by those skilled in the art that the automatic policy feature can be implemented in combination with a previously described embodiment, such as the exemplary embodiment illustrated in FIG. 9. For example, if the registry value is not located in the non-policy section, a default value and/or an error message may be returned to the application, as described with respect to FIG. 9.

Alternative embodiments will become apparent to those skilled in the art to which the present invention pertains without departing from its spirit and scope. Accordingly, the scope of the present invention is defined by the appended claims and is supported by the foregoing description and drawings.

What is claimed is:

1. A computer-implemented method for retrieving data from a registry, comprising:
    invoking a call from a program module in an application to a registry interface, the call having a parameter associated with selected data of the registry;
    receiving at a registry interface a the parameter for the selected data in the registry,
    using the parameter to obtain the selected registry data from the registry, and communicating the selected registry data from the registry interface to the application.

2. The method of claim 1, further comprising the step of caching selected registry information, wherein the selected registry information references the registry data.

3. The method of claim 1, further comprising using a look-up string to retrieve the selected registry data from the registry, wherein the look-up string comprises constant data representing a registry value.

4. The method of claim 1, wherein the step of communicating the selected registry data comprises the step of:
    in the event that the selected registry data associated with the parameter cannot be found by the registry interface in the registry, returning to the application default data maintained in a database separate from the registry.

5. The method of claim 1, wherein the step of communicating the selected registry data comprises the step of:
    in the event that the selected registry data associated with the parameter cannot be found in the registry by the registry interface, returning error data to the application.

6. The method of claim 1, wherein the registry comprises a policy section and a nonpolicy section, and the step of communicating the selected registry data comprises the steps of:
    searching for the selected registry data in at least one of the policy section of the registry and the nonpolicy section;
    retrieving the selected registry data from at least one of the nonpolicy section of the registry and the policy section of the registry; and
    returning to the application the selected registry data from the registry interface.

7. The method of claim 1, wherein the application comprises an operating system and the parameter is contained within an operating system call.

8. A computer-readable medium having computer-executable instructions for performing the steps recited in claim 1.

9. A system having a registry, a registry interface, and an application arranged to perform the steps recited in claim 1.

10. A method for automatically invoking a policy contained in a registry, comprising:
   receiving at a registry interface a request from a program module to retrieve selected data from the registry;
   using the registry interface to search a section of the registry to determine whether the policy exists for the selected registry data;
   in the event the policy exists for the selected registry data, invoking the policy;
   in the event the policy does not exist for the selected registry data, using the registry interface to retrieve the selected registry data from another section of the registry; and
   returning the selected registry data from the registry interface to the program module.

11. The method of claim 10, wherein the step of invoking the policy comprises denying access to the selected registry data by the program module.

12. A computer-readable medium having computer-executable instructions for performing the steps recited in claim 10.

13. A system having a registry, a registry interface, and an application that is arranged to perform the steps recited in claim 10.

14. A method for retrieving data from a registry of a computer system, comprising:
   storing in a registry information database information related to the data maintained by the registry;
   creating source code based on the information in the registry information database;
   building a program module by compiling the source code and source files for the program module;
   executing the program module;
   invoking a call from the program module to a registry interface, the call having a parameter associated with selected data of the registry;
   using the registry interface to retrieve the selected registry data associated with the call parameter from the registry; and
   sending the selected registry data from the registry interface to the program module.

15. The method of claim 14, wherein the call parameter comprises constant data.

16. The method of claim 15, wherein the constant data comprises a registry key.

17. The method of claim 16, wherein the registry key is derived by accessing a table containing the constant data and generating a string representation of the registry key.

18. The method of claim 15, wherein the constant data comprises a registry value.

19. The method of claim 14, wherein the step of retrieving the selected registry data from the registry comprises the steps of:
   searching for the selected registry data associated with the call parameter; and
   in the event that the selected registry data associated with the call parameter cannot be found in the registry, using the registry interface to retrieve default data.

20. The method of claim 14, wherein the step of retrieving the selected registry data from the registry comprises the steps of:
   searching for the selected registry data associated with the call parameter; and
   in the event that the selected registry data associated with the parameter cannot be found in the registry, using the registry interface to retrieve error data associated with the call parameter.

21. The method of claim 14, wherein the registry comprises a policy portion and a nonpolicy portion, and the step of retrieving the selected registry data from the registry comprises the steps of:
   searching for the selected registry data associated with the call parameter in the policy portion of the registry; and
   in the event that the selected registry data associated with the parameter cannot be found in the policy portion, using the registry interface to retrieve the selected registry data from the nonpolicy portion of the registry.

22. The method of claim 14, wherein the program module comprises an operating system and the call comprises an operating system call.

23. A computer-readable medium having computer-executable instructions for performing the steps recited in claim 14.

24. A system having a registry, a registry interface, and an application that is arranged to perform the steps recited in claim 14.

\* \* \* \* \*